March 31, 1936.                S. C. WINGER                    2,035,582
                      VARIABLE RATIO TRANSMISSION DEVICE
                            Filed Oct. 15, 1934            2 Sheets-Sheet 2
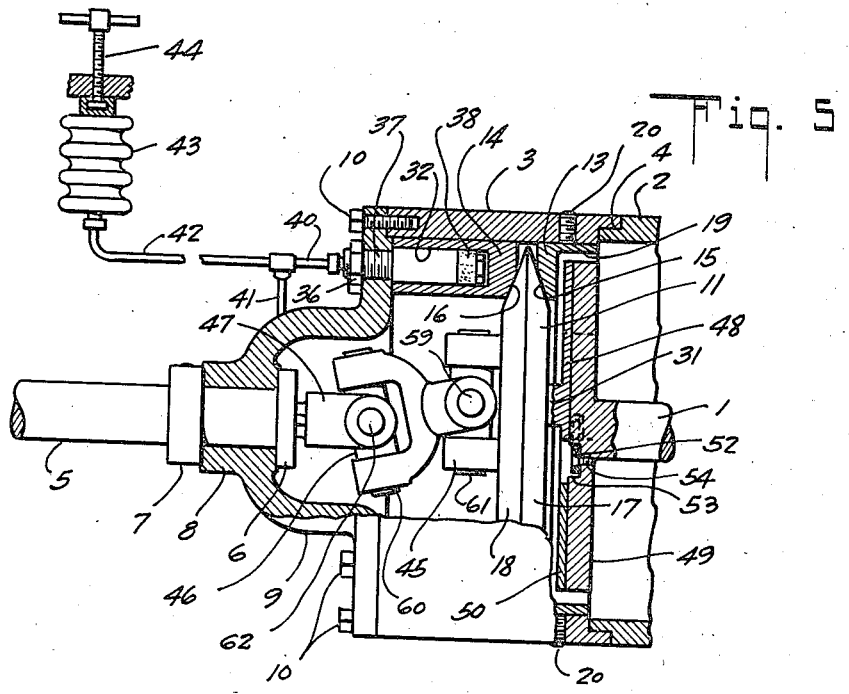
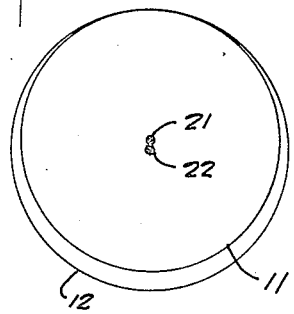
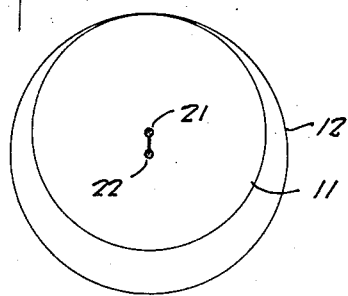
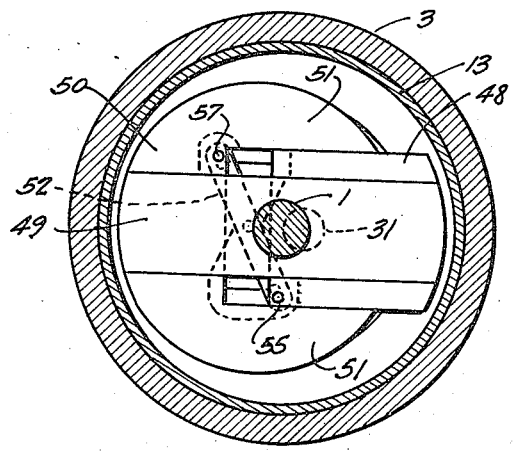
INVENTOR
Stover C. Winger
BY John Flam
ATTORNEY Patented Mar. 31, 1936

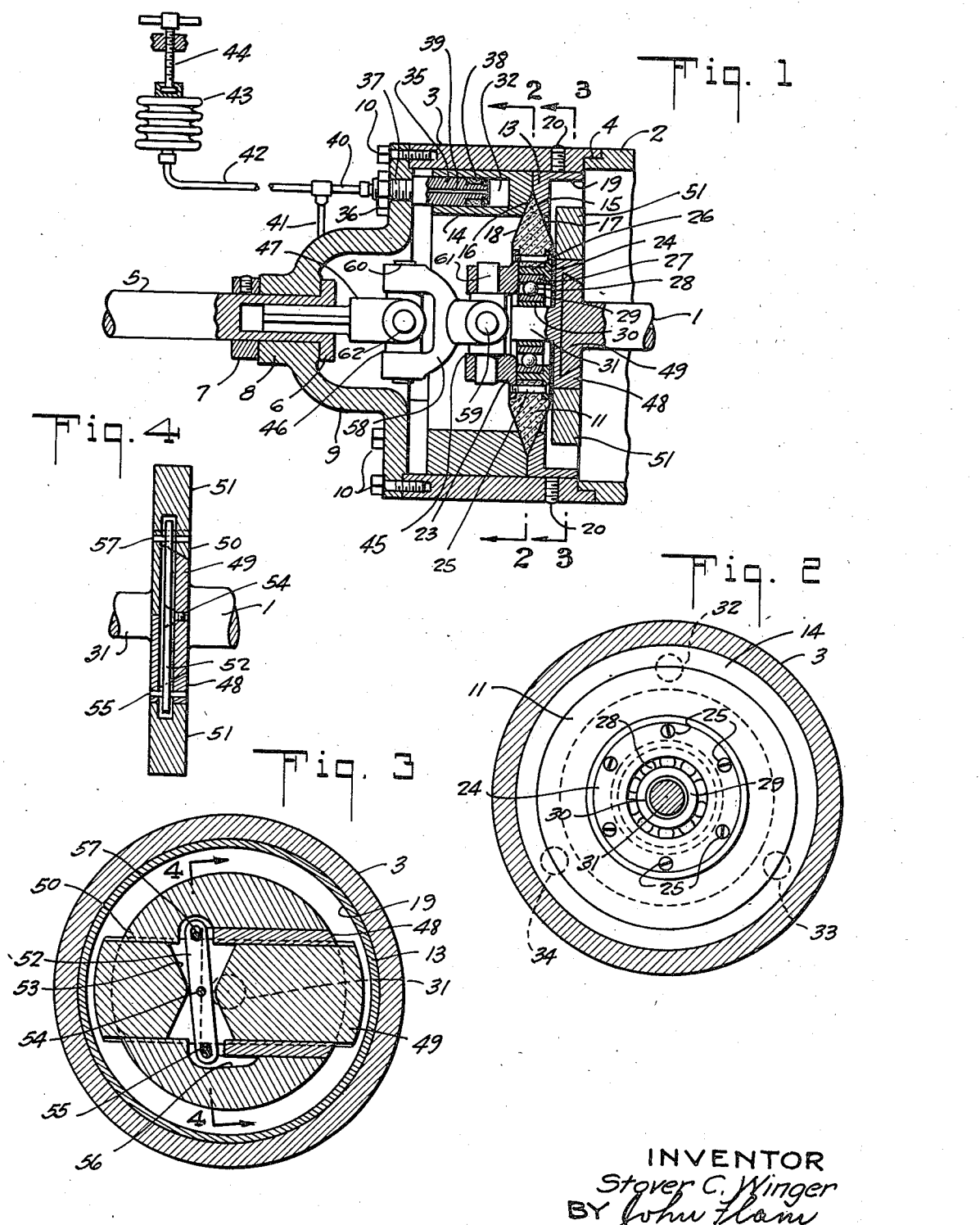

2,035,582

UNITED STATES PATENT OFFICE 2,035,582

VARIABLE RATIO TRANSMISSION DEVICE

Stover C. Winger, Los Angeles, Calif., assignor to Guy H. Hall, Los Angeles, Calif.

Application October 15, 1934, Serial No. 748,273

14 Claims. (Cl. 74—281)

This invention relates to a device for varying the ratio of transmission through a continuous range. Such a device can be used in connection with any appropriate source of power, such as an automobile engine or electric motor, or any prime mover.

It is one of the objects of my invention to make it possible to bring the speed of the take-off shaft to a standstill while the source of motion is in operation (corresponding to a ratio of infinity), and to increase said speed by continuous variation to a maximum speed, which may be greater or less than the speed of the source.

It is another object of this invention to secure these results by the aid of a very simple and compact device, having relatively few moving parts.

It is still another object of the invention to secure these results by the aid of a system of wheels, in which there is relative rolling action between the wheels, and so arranged that the effective diameter of one or both wheels is adjustable to vary the ratio of transmission. Preferably, one wheel rolls on an inner surface of the other; and the effective diameter of the rolling wheel is varied, so that the rate of revolution of the rolling wheel about its own axis (corresponding to the speed of the take-off shaft), varies as this effective diameter varies.

The rolling wheel is supported for free rotation about an axis which can be displaced from the axis of the driving source; the degree of displacement corresponds to its effective diameter. When this displacement is zero (that is, the axis of the rolling wheel is the axis of the source of motion), the effective diameters of the two wheels are equal, and there is no relative rolling action. This corresponds to standstill, the power shaft merely rotating freely within the rolling wheel. As the axis of this wheel is displaced from the axis of the source, its effective diameter is caused to decrease, with a corresponding increase in the speed of the take-off shaft. This displacement of the axes can be effected in several ways; but it is preferred to utilize centrifugal force for this purpose. Thus at higher speeds, the centrifugal force becomes greater, since it varies as the square of the speed, and the frictional force for transmitting the power between the two wheels is increased.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings:

Figure 1 is a vertical sectional view of a device incorporating the invention, the setting being such that the speed ratio is infinity, together with one form of control mechanism therefor;

Fig. 2 is a sectional view taken along plane 2—2 of Fig. 1;

Fig. 3 is a sectional view taken along the plane 3—3 of Fig. 1;

Fig. 4 is an enlarged detail section taken mainly along the line 4—4 of Fig. 3;

Fig. 5 is a view similar to Fig. 1, but illustrating a setting of the apparatus in which the speed ratio has departed from infinity;

Fig. 6 is a view of the same general character as Fig. 3, but showing the operation of the mechanism for adjusting the eccentricity of the planetary wheel; and Figs. 7 and 8 are diagrams illustrating the mode of operation of the planetary system.

In the present instance the shaft 1 is intended to be connected to a source of motion, such as an electric motor or a gasoline engine or the like. This source of motion is shown as having a frame member 2 to which can be attached a housing 3 which encloses the main portions of the apparatus. This housing 3 can be of general cylindrical form and can be telescoped over the reduced end 4 of the frame member 2.

The load to be operated is adapted to be connected to a take-off shaft 5. This take-off shaft is adapted to be driven at varying speeds in a manner to be hereinafter described.

Shaft 5 is shown as being provided with collars 6 and 7 engaging opposite sides of a central boss 8 of a cover or cap member 9. This cover or cap member 9 is disposed over the housing 3 and can be fastened in place as by the aid of a plurality of cap screws 10.

The variable speed ratio mechanism includes a pair of wheels. One of these wheels, such as 11 is capable of being placed into planetary relationship with another wheel, the pitch line of which is diagrammatically illustrated by circle 12 in Figs. 7 and 8. Wheel 11 is adapted to be revolved in its planetary path by the source of power connected to shaft 1; and its angular rotation about its own axis is utilized for driving the shaft 5. Before describing in detail the construction of the wheels, reference may be had to diagrams, Figs. 7 and 8, to explain the mode of operation of the device.

Assuming that the circle 12 in Figs. 7 and 8 is the circle along which the planetary wheel 11 rolls, it can readily be shown that the ratio of reduction from shaft 1 to the axis of planetary wheel 11 can be expressed by the following formula:

$$\frac{d}{D-d},$$

where $d$ is the effective diameter of wheel 11 and $D$ is the effective diameter of the circle of contact 12. It is thus seen that as the effective diameter of the planetary wheel 11 is varied, the resultant ratio is correspondingly varied; and it is upon this variation in effective diameter of the planetary wheel 11 that the ratio of reduction depends. Furthermore, when the two diameters are equal, which is the condition illustrated in Fig. 1, the ratio becomes infinity and shaft 5 is therefore at a standstill.

The stationary wheel defining the pitch circle 12 is formed of two elements 13 and 14. These two elements have, respectively, sloping surfaces 15 and 16. These surfaces form a groove with converging sides for the accomodation of the incline faces 17 and 18 of wheel 11. This wheel 11 is made from some appropriate wear resisting material such as rubber, leather, fabric, or the like. The section 13 of wheel 12 is shown as being held in rigid position inside of the housing 3 as by the aid of its flange 19 telescoping within the housing 3, by a series of headless set screws 20. The opposite member 14 also telescopes within the housing 3 but is slidable therein so that the groove formed by the inclined faces 15 and 16 can be adjusted in width.

The minimum width of the groove is illustrated in Fig. 1. In this instance the wheel 11 has the same effective diameter as wheel 13—14, and there is no planetary motion nor rotation of wheel 11 about its own axis. However, when the sections 13 and 14 are separated, as for example, as shown in Fig. 5, the planetary wheel 11 can move radially outwardly so as to provide a rolling contact. This rolling contact is at a smaller radius to the axis of wheel 11 than before. Accordingly, the condition of Fig. 7 exists. In this figure the axis of the planetary wheel 11 is illustrated by the reference character 21 and the axis of rotation of the driving shaft is illustrated by the reference character 22. It is thus seen that in order to provide this variation in relative diameters of wheels 11 and 13—14, it is necessary to shift the axis 21 of wheel 11 out of axial alinement with the axis of shafts 1 and 5. These shafts are coaxial as shown most clearly in Figs. 1 and 5.

The manner in which the wheel 11 is supported for planetary drive by shaft 1 will now be described. Wheel 11 is provided with a pair of metallic flanges 23 and 24, held to the wheel as by the aid of screws 25. There is a central aperture through wheel 11 in which is accommodated a bushing member 26. Confined between the flanges 23 and 24 and in contact with bushing member 26 is the outer race 27 of a ball bearing structure 28. The inner race 29 of ball bearing structure 28 is shown as supported on a bushing 30 pressed on a short stub shaft 31. It is thus apparent that the wheel 11 is mounted for rotation on this stub shaft 31. However, when the axis of stub shaft 31 is alined with the axis of shafts 1 and 5, the stub shaft 31 merely rotates freely inside of wheel 11 which is restrained against rotation by frictional contact of the surfaces 15 and 16 around the entire periphery of wheel 11. This condition, as stated heretofore, corresponds to equality between diameters $d$ and $D$ in the formula set forth above.

The axis of stub shaft 31 can be moved out of alinement with the common axis of shafts 1 and 5 by any appropriate mechanism while the sections 13 and 14 are separated to comply with this new setting of the axis. Such a new setting is illustrated in Fig. 5. It is apparent that positive means can be utilized to adjust either of these two variables; that is, the spacing of surfaces 15 and 16, or the off-center adjustment of wheel 11; and the other variable can be arranged to be adjusted automatically, as by resilient means, or positively. In the present instance the spacing of surfaces 15 and 16 is accomplished in a positive manner and when this is done, the wheel 11 automatically is urged outwardly to contact with the sloping converging surfaces 15 and 16.

Thus the member 14 can be urged toward the right as viewed in Figs. 1 and 5, as by the aid of fluid pressure. For this purpose three bores 32, 33 and 34 can be provided inside of the section 14, having axes parallel to the axes of shafts 1 and 2. These bores telescope over stationary pistons such as 35. These pistons are held rigidly to the cover member 9 as by the aid of the nuts 36 engaging the threaded portion, such as 37 extending from the stationary piston 35. Each of the stationary pistons, such as 35, can be provided with one or more appropriate packing rings such as 38. Furthermore, each of the pistons such as 35 is provided with an axial aperture 39 communicating with bore 32 by the aid of conduits such as 40, 41 and 42. Each of these axial apertures 39 is connected with a variable volume chamber such as metal bellows 43. This metal bellows can be compressed or expanded as by the aid of the hand screw 44. The cylinder spaces, such as 32, together with the connecting conduits 40, 41 and 42 and the metal bellows 43 is filled with an incompressible liquid such as oil. When the bellows 43 is compressed, reducing its volume, the incompressible liquid serves to transmit liquid pressure to chamber 32 and the section 14 is moved toward the right. Conversely, when the bellows 43 is expanded the cylinder space 32 must be reduced to comply with the invariable volume of the liquid when section 14 moves to the left. The extreme left hand position is indicated in Fig. 5, where the bellows 43 is shown in fully expanded form.

By the action of a resilient force such as centrifugal force as in this instance, the separation of section 14 from section 13 causes a corresponding increase in eccentric movement of planetary wheel 11. This planetary wheel is connected as by the aid of the universal joints 45 and 46 to a clevis 47 splined into the shaft 5. In this way the angular rotation of planetary wheel 11 about its own axis is transferred to shaft 5 for any position of eccentricity of planetary wheel 11.

The particular mechanism for utilizing centrifugal force to urge planetary wheel 11 into the groove 15—16 is shown to best advantage in Figs. 1, 3, 4, 5, and 6. In these figures it is seen that the stub shaft 31 is mounted on a slide 48. This slide has a dove-tailed connection with a transverse head 49 fastened to the shaft 1.

Also mounted on the transverse head 49 is a weight 50. This weight 50 is dove-tailed as shown most clearly in Fig. 3 adjacent the left hand portion of the head 49, as viewed in Figs. 3 and 6. This member forms a slide and carries the overhanging arcuate weights 51 which extend over the edge of the slide 48. Under centrifugal force, the members 48 and 50 move in opposite directions. The entire mechanism is balanced by the aid of the weights 51, which compensate for the weight of the wheel 11 and its associated parts.

In order to ensure that both elements 48 and 50 will move in unison, use is made of a connecting link 52 disposed in a slot 53 in the head 49. This slot has sloping sides as illustrated in Fig. 3 to limit the link rotation. This link 52 is pivoted as by a pin 54 inside of the slot 53. The extremities of link 52 are respectively connected as by a slot and pin connection, to the slides 48 and 50. For the position shown in Fig. 3 the lower end of link 52 has a slot and pin connection 55 with the inner edge of slide 48. The weight 51 is shown as slotted at 56 to permit free movement of the lower end of the link 52. The upper end of the link 52 is connected by the slot and pin connection 57 to the slide 50.

It is thus apparent that the slide 50 serves to provide a counterweight for the slide 48 which carries the stub shaft 31; and as soon as shaft 1 is rotated, these slides are urged to move outwardly and away from each other, under the influence of centrifugal force.

An important advantage is obtained by the use of a centrifugal force, because as the axis of stub shaft 31 moves outwardly, the effect of the centrifugal force increases, creating a greater force urging the wheels 11 and 13—14 into driving relation. This corresponds to high speeds of the driven shaft 5.

The universal joints 45 and 46 are shown merely diagrammatically. They include an intermediate yoke 58 having clevises at opposite ends engaging transverse pins 59 and 60. These points are arranged transversely to other pins 61 and 62 mounted respectively on wheel 11 and clevis 47. Of course other types of universal joints can be provided, as well as other devices for positively or resiliently adjusting the positions of wheel 11 and sections 13 and 14.

By appropriate choice of relative diameters, it is possible to alter the ratio of reduction from infinity to less than unity. In other words the shaft 5 can be brought from standstill to a speed which exceeds the speed of driven shaft 1. In the present instance, the relative diameters of the wheels 11 and 12 are such that the maximum speed of shaft 5 is of the order of one-third of the speed of shaft 1. By reducing the diameter of wheel 11, however, the maximum speed of shaft 5 can be increased.

In the present instance wheel 11, by entering farther and farther between the surfaces 15 and 16, has a correspondingly decreasing effective diameter. This is the important effect for securing variable speed ratios.

The device is compact and simple, and there are few rotating parts which furthermore can be completely balanced by appropriate design of slide 50.

I claim:—

1. In a variable ratio transmission device, a wheel having a peripheral groove, the sides of the groove being convergent, another wheel having a peripheral surface corresponding to said groove and in driving relation therewith, one of said wheels being arranged to be moved in a planetary path with respect to the other wheel, the sides of the groove being capable of relative movement, and means for adjusting the distance between the axes of the wheels, whereby the sides of said groove contact at an adjustable radial distance from the axis of the said grooved wheel.

2. In a variable ratio transmission device, a non-rotary wheel having an internal groove, the sides of the groove being converging and relatively movable, a planetary wheel having a peripheral surface inclined to contact the sides, and means whereby the distance between the axes of the wheels is rendered variable, whereby the sides contact said planetary wheel at correspondingly variable distances from the axis of said planetary wheel.

3. In a variable ratio transmission device, a pair of coaxial drive connections, respectively for a source of power and for a load, a wheel supported for rotation about an axis, means for varying the distance between the axis of said wheel and the axis of said connections, as well as to reduce said distance to zero, means connecting the axis of said wheel with one driving connection, a universal axis connection between said wheel and the other driving connection, said wheel having inclined friction driving faces, and a non-rotatable wheel having an internal groove with converging sides cooperating with said faces, and said sides being relatively movable to conform to the faces upon variation in the position of said rotating wheel, whereby when the axis of the wheel is alined with the axes of the drive connection, said universal axis connection is non-rotating.

4. In a variable ratio transmission mechanism, a power drive shaft, a load drive shaft coaxial therewith, a non-rotary wheel having an internal groove, the sides of which converge and are relatively movable, a wheel having an inclined face contacting said sides and mounted for rotation about an axis parallel to said shafts, means whereby the power shaft drives said rotatable wheel in a planetary path, a universal axis connection between the load shaft and said rotatable wheel, and means whereby said rotatable wheel is placed coaxial with the shafts and in contact with said groove to render the effective diameters of the wheels equal for reducing the speed of the drive shaft to zero.

5. In a variable ratio transmission mechanism, a power drive shaft, a load drive shaft coaxial therewith, a non-rotary wheel having an internal groove, the sides of which converge and are relatively movable, a wheel having an inclined face contacting said sides and mounted for rotation about an axis parallel to said shafts, centrifugal means for urging said rotary wheel outwardly into contact with said groove, said centrifugal means being operated by the power shaft, and the outward travel of the said rotary wheel being limited by the spacing of the groove sides, and an axial drive connection between the rotary wheel and the load shaft.

6. In a variable ratio transmission mechanism, a wheel member having relatively movable sides forming a circular converging groove, and another wheel having an axis parallel to that of the circular groove, as well as inclined faces adapted to engage the sides of said groove, whereby variations in setting of the distance between the axes of the wheels causes the effective diameter of the wheel having inclined faces to vary correspondingly, and one of said wheels being planetary with respect to the other.

7. In a variable ratio transmission mechanism, a wheel member having relatively movable sides forming a circular converging groove, another wheel having an axis parallel to that of the circular groove, as well as inclined faces adapted to engage the sides of said groove, one of said wheels being planetary with respect to the other, and means for adjusting the spacing of the groove sides to vary the effective diameter of the wheel having the inclined faces.

8. In a variable ratio transmission mechanism, a wheel member having relatively movable sides forming a circular converging groove, another wheel having an axis parallel to that of the circular groove, as well as inclined faces adapted to engage the sides of said groove, one of said wheels being planetary with respect to the other, and means for varying the distance between the axes of the wheels to cause the effective diameter of the wheel with inclined faces to vary correspondingly.

9. In a variable ratio transmission device, a non-rotary member forming an internal circular groove with converging sides, said sides being relatively adjustable toward and from each other, a wheel having inclined faces in driving contact with the sides of the groove, and an axis parallel to the axis of the circle of the groove, means whereby said sides can be adjusted to permit the wheel to contact with the groove at varying effective diameters, means for mounting the wheel for rotation, power means for causing said wheel to move in a planetary manner with respect to the groove, means acting by virtue of centrifugal force produced in response to the operation of the power means, for urging said wheel into contact with the groove, and a load shaft operated in accordance with the angular motion of the wheel about its own axis, said load shaft being coaxial with the non-rotary member.

10. In a variable ratio transmission device, a pair of wheels in frictional driving relation to each other, one of said wheels being arranged to be moved in a planetary path with respect to the other wheel, one of the said pair of wheels having sides forming a peripheral groove, the sides of the groove being convergent, the other of said pair of wheels having a peripheral surface having sides corresponding to said groove, the sides of one of the wheels being capable of relative adjustment, and means for adjusting the distance between the axes of the wheels, whereby the sides of the groove contact at an adjustable radial distance from the axis of the non-planetary wheel.

11. In a variable ratio transmission device, a non-rotary wheel, a planetary wheel, one of said wheels having sides forming a peripheral groove, the sides of the groove being converging, the other of said wheels having a peripheral surface having sides to contact the sides of the groove, the sides of one of the wheels being relatively movable, and means whereby the distance between the axes of the wheels is rendered variable, whereby the sides contact said peripheral surface at correspondingly variable distances from the axis of said planetary wheel.

12. In a variable ratio transmission device, a pair of coaxial drive connections, respectively for a source of power and for a load, a wheel supported for rotation about an axis, means for varying the distance between the axis of said wheel and the axis of said connections, as well as to reduce said distance to zero, means connecting the axis of said wheel with one driving connection, a universal axis connection between said wheel and the other driving connection, said wheel having inclined friction driving faces, and a non-rotatable wheel having an internal surface with inclined driving faces contacting with the faces of the other wheel, the driving faces of one of the wheels being relatively movable to conform to the faces of the other wheel, upon variation in the position of said rotating wheel, whereby when the axis of the rotatable wheel is alined with the axes of the drive connection, said universal axis connection is non-rotating.

13. In a variable ratio transmission mechanism, a power drive shaft, a load drive shaft coaxial therewith, a non-rotary wheel having a pair of inclined internal peripheral surfaces, another wheel having corresponding inclined faces forming surfaces respectively contacting said internal surfaces, the surfaces of one of the wheels being relatively movable, and said other wheel being mounted for rotation about an axis parallel to said shafts, means whereby the power shaft drives said rotatable wheel in a planetary path, a universal axis connection between the load shaft and said rotatable wheel, and means whereby said rotatable wheel is placed coaxial with the shafts and in contact with said internal surfaces to render the effective diameters of the wheels equal for reducing the speed of the drive shaft to zero.

14. In a variable ratio transmission device, a non-rotary wheel forming an internal driving surface with inclined faces, a rotary wheel having inclined faces in driving contact with said internal surface, and an axis parallel to the axis of the internal driving surface, means whereby the faces of one of the wheels can be adjusted to permit the wheels to contact at variable effective diameters, power means causing said rotary wheel to move in a planetary manner with respect to the non-rotary wheel, means acting by virtue of centrifugal force produced in response to the operation of the power means, for urging said rotary wheel into contact with said internal surface, and a load shaft operated in accordance with the angular motion of the rotary wheel about its own axis, said load shaft being coaxial with the non-rotary member.

STOVER C. WINGER.